(12) United States Patent
Wang et al.

(10) Patent No.: US 12,382,963 B2
(45) Date of Patent: Aug. 12, 2025

(54) AIR COOKING DEVICE

(71) Applicant: IB APPLIANCES US HOLDINGS LLC, Downers Grove, IL (US)

(72) Inventors: Jiwei Wang, Ottawa (CA); Yude Han, Zhejiang (CN); Hongyuan Wang, Hangzhou (CN)

(73) Assignee: IB APPLIANCES US HOLDINGS, LLC, Chicago, IL (US)

( * ) Notice: Subject to any disclaimer, the term of this patent is extended or adjusted under 35 U.S.C. 154(b) by 1048 days.

(21) Appl. No.: 17/390,416

(22) Filed: Jul. 30, 2021

(65) Prior Publication Data
US 2022/0039396 A1    Feb. 10, 2022

(30) Foreign Application Priority Data
Aug. 10, 2020  (CN) .......................... 202021649437.5

(51) Int. Cl.
*A47J 37/06*  (2006.01)
*A21B 1/26*   (2006.01)
*F24C 15/32*  (2006.01)

(52) U.S. Cl.
CPC ............. *A21B 1/26* (2013.01); *A47J 37/0641* (2013.01); *F24C 15/322* (2013.01)

(58) Field of Classification Search
None
See application file for complete search history.

(56) References Cited

U.S. PATENT DOCUMENTS

| | | | |
|---|---|---|---|
| 4,734,562 A | 3/1988 | Amano et al. | |
| 9,980,605 B2 | 5/2018 | De Haas et al. | |
| 2019/0059647 A1 | 2/2019 | Floessholzer | |

FOREIGN PATENT DOCUMENTS

| | | |
|---|---|---|
| CN | 204105799 U | 1/2015 |
| CN | 204708660 U | 10/2015 |
| CN | 204765168 U | 11/2015 |
| CN | 106308568 A | 1/2017 |
| CN | 205849309 U | 1/2017 |
| CN | 206371941 U | 8/2017 |
| CN | 206560354 U * | 10/2017 |
| CN | 208192920 U | 12/2018 |
| CN | 106308568 B | 3/2019 |

(Continued)

OTHER PUBLICATIONS

Extended European Search Report for European Patent Application No. 21190394.3 dated Jan. 24, 2022, 8 pages.

(Continued)

*Primary Examiner* — Jorge A Pereiro
(74) *Attorney, Agent, or Firm* — Crowell & Moring LLP

(57) ABSTRACT

An air cooking device is equipped with a cooking cavity and includes a heating device and a fan above the cooking cavity. The fan is used to suck up the wind in the cooking cavity and blow it toward the heating device, and the hot air blows to the cooking cavity to cook food. The air cooking device includes a protective cover under the fan. The protective cover includes an air inlet, an air outlet, and a shielding portion between the air inlet and the air outlet. The shielding portion is located under the heating device to prevent the heating device from directly heating the ingredients in the cooking cavity, and to prevent the surface of food from becoming burnt.

20 Claims, 6 Drawing Sheets

(56) References Cited

FOREIGN PATENT DOCUMENTS

| CN | 209436989 U | | 9/2019 | |
|---|---|---|---|---|
| CN | 209437019 U | | 9/2019 | |
| CN | 209678283 U | | 11/2019 | |
| DE | 202013100659 U1 | * | 6/2013 | .......... A47J 37/0641 |
| FR | 2312919 A | * | 1/1977 | .......... A47J 37/0623 |
| FR | 3082412 A1 | | 12/2019 | |
| KR | 101217924 B1 | * | 1/2013 | |
| WO | WO 2017/202641 A1 | | 11/2017 | |
| WO | WO 2019/153807 A1 | | 8/2019 | |

OTHER PUBLICATIONS

European Search Report for European Patent Application No. 21185482.3 dated Dec. 8, 2021, 8 pages.
U.S. Appl. No. 17/379,307, filed Jul. 19, 2021, Wang et al.
U.S. Appl. No. 17/390,450, filed Jul. 30, 2021, Han et al.
U.S. Appl. No. 17/390,488, filed Jul. 30, 2021, Wang et al.
Extended European Search Report for European Patent Application No. 21190387.7 dated Jan. 4, 2022, 8 pages.

* cited by examiner

AIR COOKING DEVICE

RELATED APPLICATION

The present application claims priority to Chinese Patent Application Number CN2020216494375, filed Aug. 10, 2020, the entirety of which is hereby incorporated by reference.

FIELD

This application is related to the field of small household appliances, and particularly related to an air cooking device.

BACKGROUND

Air cooking devices are being used by more and more consumers. Different from the conventional method of frying with hot oil, air cooking devices use air as a heat transfer carrier to effectively reduce the oil content of the ingredients and provide users with a healthy diet. The current air cooking devices can be basically divided into two types: drawer type and clamshell type. The relevant drawer type air cooking device includes a light-wave tube and a temperature measuring device. The light emitted by the light-wave tube easily irradiates the food material, causing a situation in which the ingredients may become burnt.

SUMMARY OF THE DESCRIPTION

This application provides an air cooking device which can prevent the heating device from heating the food directly.

More specifically, this application provides an air cooking device which is equipped with a cooking cavity, and includes a heating device and a fan above the cooking cavity, wherein the fan is used to suck up air in the cooking cavity and blow it toward the heating device, and the hot air blows to the cooking cavity to cook food. The air cooking device includes a protective cover under the fan; the protective cover includes an air inlet, an air outlet, and a shielding portion between the air inlet and the air outlet. The shielding portion is located under the heating device to prevent the heating device from directly heating the ingredients in the cooking cavity.

Further, the heating device may include a light-wave tube. The light-wave tube may be arranged as a superior arc, and the shielding portion may be located below the light-wave tube to shield the light emitted by the light-wave tube and prevent the light emitted by the light-wave tube from directly irradiating the ingredients in the cooking cavity.

Further, the light-wave tube may be arranged around the periphery of the fan.

Further, the lowest point of the fan may be higher than the lowest point of the light-wave tube, and lower than the highest point of the light-wave tube.

Further, the position of the air outlet may be lower than the position of the air inlet.

Further, the shielding portion may include a separating portion that turns from the lower side of the heating device to the inner side of the heating device, and is upwardly close to the lower side of the fan, wherein the separating portion prevents the wind blown by the fan to the heating device from directly returning to the air inlet without passing through the heating device.

Further, the shielding portion may include a guiding portion that turns from the lower side of the heating device to the outer side of the heating device, and is downwardly away from the fan, wherein the guiding portion keeps the hot air passing through the heating device as far away as possible from the air inlet.

Further, the air cooking device may include a temperature measuring device located above the cooking cavity, wherein the temperature measuring device is used to detect the temperature in the cooking cavity. The air cooking device may also include a shielding cover between the heating device and the temperature measuring device. The shielding cover shields the heating device from radiating and heating the temperature measuring device.

Further, the shielding cover may include a first shielding piece and a second shielding piece connected together, wherein the temperature measuring device is located in the space enclosed by the first shielding piece and second shielding piece, wherein the included angle between the first shielding piece and second shielding piece is an acute angle, and the end point of the acute angle faces toward the wind direction, and the angle bisector of the included angle is roughly parallel to the wind direction of the wind blown by the fan to reduce the resistance of the shielding cover to the wind blown by the fan.

Further, the included angle between the angle bisector of the included angle between the first shielding piece and the second shielding piece and the wind direction of the wind blown by the fan may be greater than or equal to 0 degrees and less than or equal to 20 degrees.

The protective cover of the air cooking device of the embodiment of this application includes an air inlet, an air outlet, and a shielding portion between the air inlet and the air outlet, wherein the shielding part is located under the heating device to prevent the heating device from directly heating the ingredients in the cooking cavity, and to prevent the surface of ingredients from being burned.

DETAILED DESCRIPTION

Here, exemplary implementations will be explained in detail, and examples thereof are shown in the attached figures. When the following description refers to the attached figures, unless otherwise indicated, the same numbers in different attached figures indicate the same or similar elements. The implementations described in the following exemplary implementations do not represent all implementations consistent with this application. To the contrary, they are only examples of devices that are consistent with some aspects of this application.

The terminology used in this application is only for the purpose of describing specific implementations, and is not intended to limit the scope of this application. Unless otherwise defined, the technical or scientific terms used in this application shall have the usual meanings understood by those with general skills in the field to which this application belongs. "First", "second" and similar words used in this application do not indicate any order, quantity or importance, but are only used to distinguish different components. Similar words such as "one piece" or "one", etc. do not mean a quantity limit, but mean that there is at least one. "Multiple pieces" or "several" means two or more. Unless otherwise indicated, similar words such as "front", "rear", "lower" and/or "upper" are only for convenience of description, and are not limited to one position or one spatial orientation. "Including" or "containing" and other similar words mean that the elements or items appearing before the word "including" or "containing" cover the elements or items appearing after "including" or "containing" and their equivalents, and do not exclude other elements or items. Similar words such as "connecting" or "coupling" are not limited to physical or mechanical connections, and may include electrical connections, no matter whether it is direct or indirect. The singular forms of "a kind" and "this" used in this application are also intended to include plural forms, unless the context clearly indicates other meanings. It should also be understood that the term "and/or" as used herein refers to and includes any or all possible combinations of one or more associated listed items.

Figure 1:
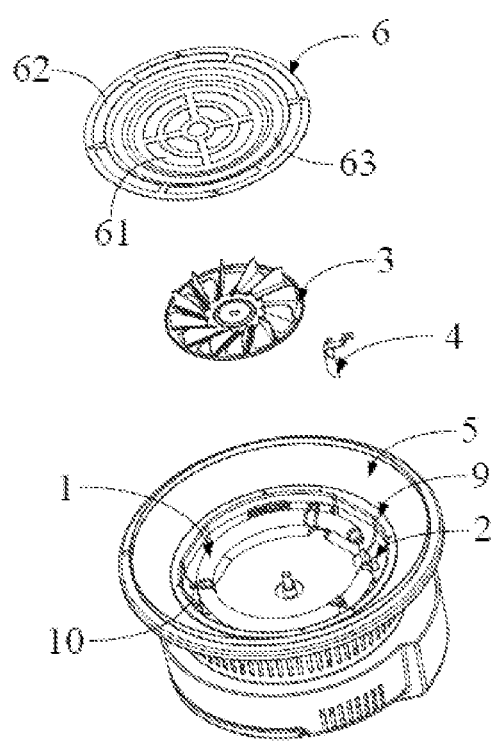
FIG. 1 is an exploded view of the air cooking device in the implementation of this application, in which only some parts of the air cooking device are shown.
Figure 2:
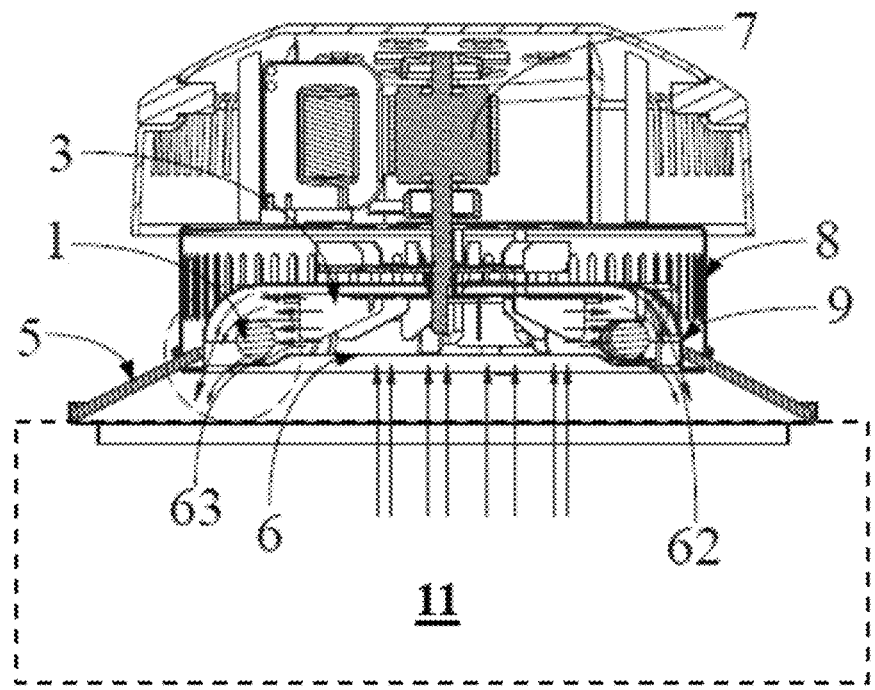
FIG. 2 is a schematic cross-sectional view of the assembled air cooking device shown in the FIG. 1, in which the arrow indicates the wind direction.
Figure 3:
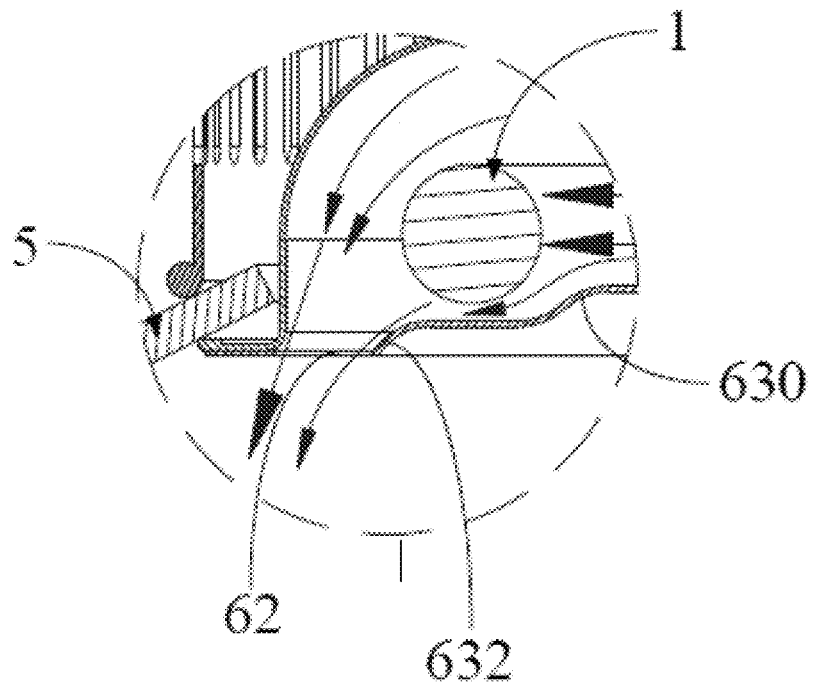
FIG. 3 is an enlarged view of the circled part of the cross-sectional schematic view shown in the FIG. 2.

As shown in FIG. 1 to FIG. 3, the air cooking device disclosed in this application can be an air fryer or other oven that may be designed with air frying function. The air cooking device can be a drawer type or a clamshell type. The air cooking device is equipped with a cooking cavity 11 (generally depicted by a dashed line) and includes a heating device 1 located above the cooking cavity 11, a temperature measuring device 2, a fan 3, a shielding cover 4, a transparent portion 5, a protective cover 6, and a motor 7. The fan 3 is assembled to the motor 7, and the motor 7 drives the fan 3 to rotate. The fan 3 is used to suck up air in the cooking cavity 11 and blow it toward the heating device 1. Hot air is then blown toward the cooking cavity 11 to cook food therein. The temperature measuring device 2 is used to detect the temperature in the cooking cavity 11 to control the heating device 1 to stop heating and prevent overcooking of food ingredients.

The air cooking device includes an upper shell 8 and a lower shell 9. The motor 7 is located above the upper shell 8 and the fan 3 is located below the lower shell 9. One end of the transparent portion 5 is clamped and fixed between the upper shell 8 and the lower shell 9 to fix the transparent portion 5. The material of the transparent portion 5 can be glass or the like. The transparent portion 5 is in a ring shape and surrounds the fan 3 and the heating device 1 to facilitate the observation of the cooking situation in the cooking cavity 11. The heating device 1 can be a light-wave tube. The light emitted by the heating device 1 can not only provide a heating function, but also illuminate the cooking space, so as to facilitate the observation of cooking in the cooking cavity 11. The shaft portion of the motor 7 passes through the upper shell 8 and the lower shell 9 and is then fixed with the fan 3 so that the motor 7 can drive the fan 3 to rotate.

The protective cover 6 can be fixed to the lower shell 9 by bolts, etc., to facilitate the assembly and disassembly of the protective cover 6. The protective cover 6 includes an air inlet 61, an air outlet 62, and a shielding portion 63 located between the air inlet 61 and the air outlet 62. The shielding portion 63 is located under the light-wave tube to shield the light emitted by the light-wave tube and prevent the light emitted by the light-wave tube from directly irradiating the ingredients in the cooking cavity 11, causing a situation in which the ingredients are not completely cooked, but the surface of the ingredients is burnt.

The light-wave tube is detachably fixed to the lower shell 9 through multiple metal locking buckles 10. The light-wave tube may be arranged as a superior arc (i.e., an arc extending more than 180 degrees) around the periphery of the fan 3, which facilitates the wind passing through the air inlet 61 to pass around the light-wave tube, which is beneficial to heating the air. The lowest point of the fan 3 is higher than the lowest point of the light-wave tube and lower than the highest point of the light-wave tube, to prevent the wind from the air inlet 61 from passing under the light-wave tube, potentially causing a situation in which the ingredients would not be heated.

The shielding portion 63 includes a separating portion 630 that extends from the lower side of the heating device 1 to the inner side of the heating device 1 and is positioned upwardly close or proximal to the lower side of the fan 3. The separating portion 630 prevents the wind blown by the fan 3 to the heating device 1 from directly returning to the air inlet 61 without passing through or near the heating device 1. The shielding portion 63 also includes a guiding portion 632 that extends from the lower side of the heating device 1 to the outer side of the heating device 1 and is positioned downwardly away from the fan 3. The guiding portion 632 keeps the hot air passing through the heating device 1 away from the air inlet 61 as far as possible. The position of the air outlet 62 is lower than that of air inlet 61. The shielding portion 63 has the function of guiding the wind, so that the wind in the cooking space is sucked through the air inlet 61 and heated by the heating device 1, and then directed by the blades of the fan 3 to the side wall of the lower shell 9, and through the guiding structure of the separating portion 630 and the guiding portion 632, such that the wind is blown smoothly to the ingredients in the cooking space, which can better heat the food, and at the same time, reduce wind noise.

Figure 4:
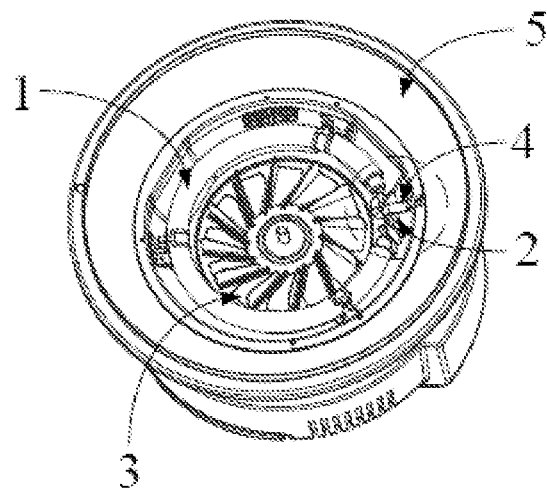
FIG. 4 is the assembly diagram of the air cooking device shown in the FIG. 1.
Figure 5:
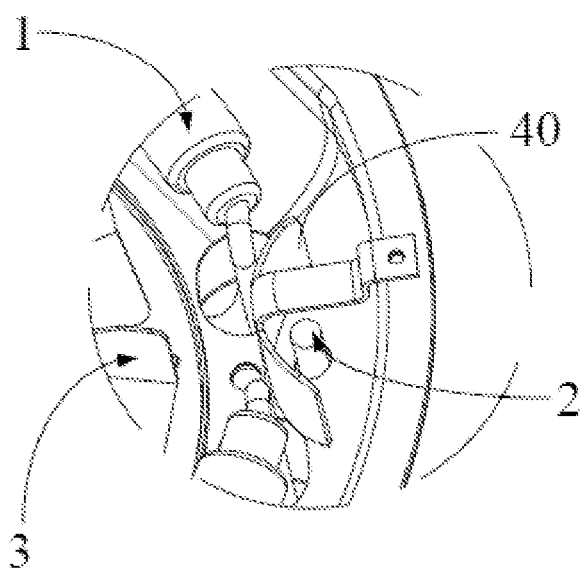
FIG. 5 is an enlarged view of the circled part of the air cooking device shown in the FIG. 4.
Figure 6:
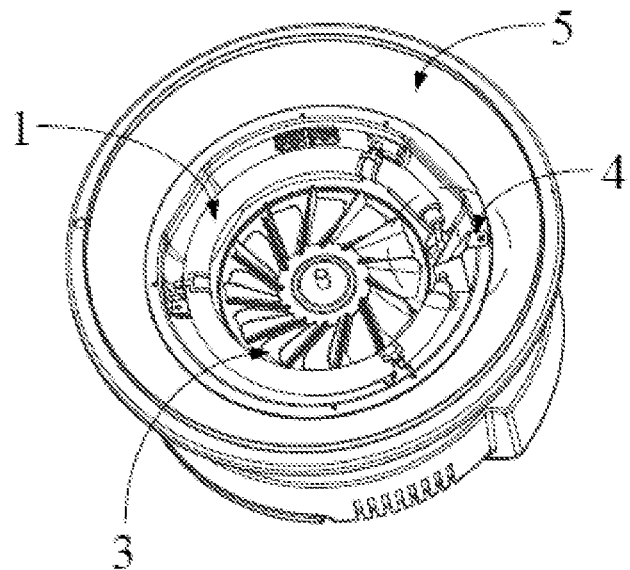
FIG. 6 is an assembly diagram of another embodiment of the air cooking device shown in the FIG. 4.
Figure 7:
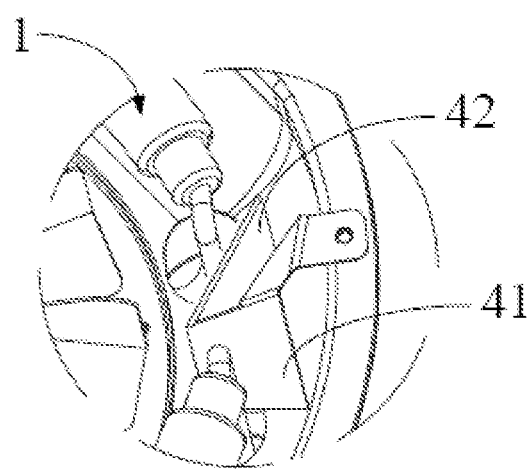
FIG. 7 is an enlarged view of the circled part of the assembly part of the air cooking device shown in the FIG. 6.
Figure 8:
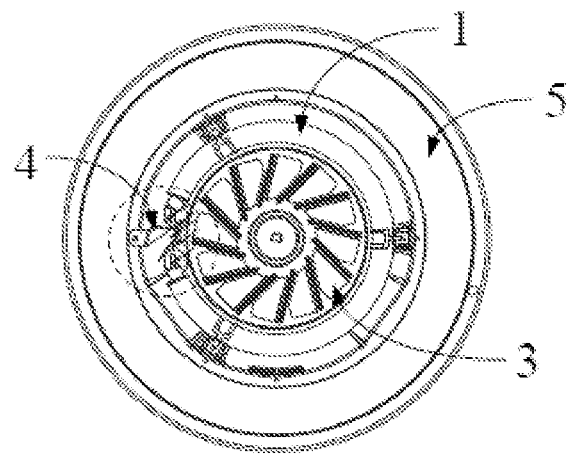
FIG. 8 is the front view of the air cooking device shown in the FIG. 6, in which the arrow indicates the wind direction.
Figure 9:
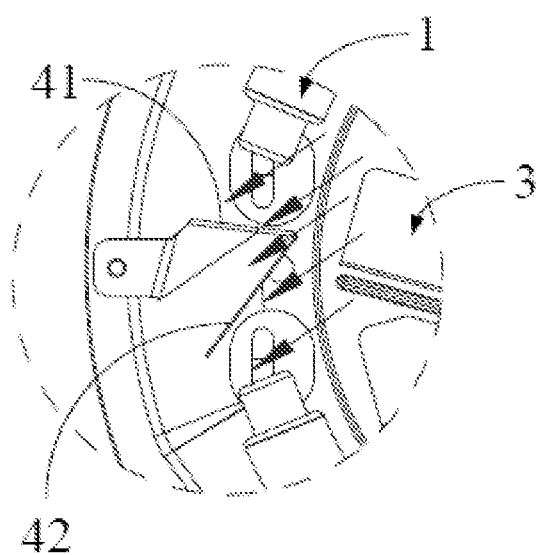
FIG. 9 is an enlarged view of the circled part of the air cooking device shown in the FIG. 8.
Figure 10:
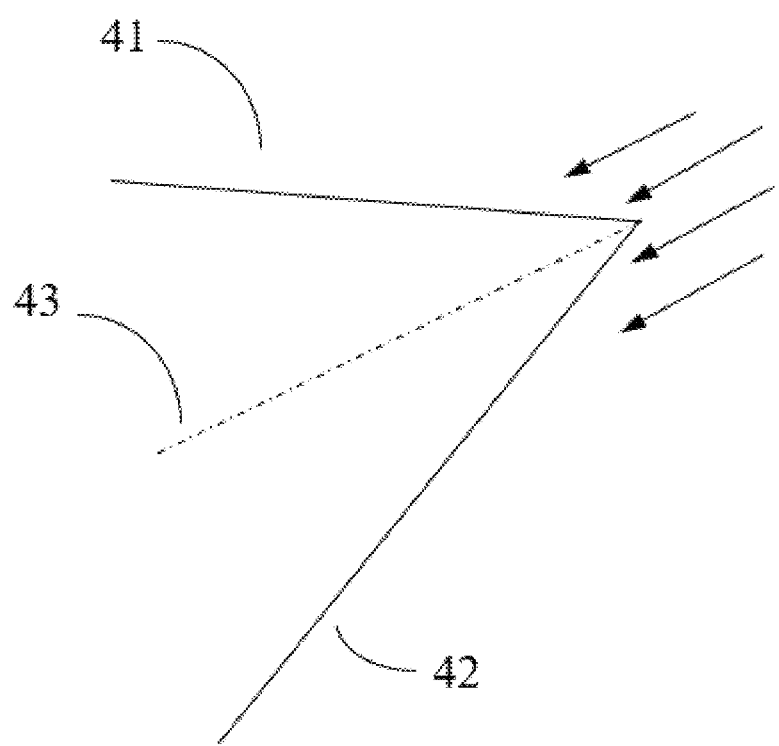
FIG. 10 is an illustration of an angle between a first shielding piece and a second shielding piece of a shielding cover according to embodiments of the present disclosure.

With reference to the FIG. 4 to FIG. 5, the shielding cover 4 can be fixed to the lower shell 9 by bolts, etc., to facilitate the assembly and disassembly of the shielding cover 4. The material of the shielding cover 4 can be metal or other materials that are light-shielding and resistant to a certain temperature. The shielding cover 4 is located between the heating device 1 and the temperature measuring device 2 to shield the temperature measuring device 2 from the heating device 1 to improve the accuracy of the temperature measurement of the temperature measuring device 2. The shielding cover 4 includes an arc-shaped shielding portion 40, and the shielding portion 40 is shielded around the periphery of the temperature measuring device 2. Where the light-wave tube is in arranged in a superior arc, the two ends of the superior arc may be two wire-outgoing ends of the light-wave tube, with the temperature measuring device 2 set between the two wire-outgoing ends, to reduce radiation and heating of the temperature measuring device 2 by the light of the light-wave tube.

With reference to the FIG. 6 to FIG. 10, in another implementation, the shielding cover 4 includes a first shielding piece 41 and a second shielding piece 42 connected together. The temperature measuring device 2 is located in the space enclosed by the first shielding piece 41 and second shielding piece 42. The included angle between the first shielding piece 41 and second shielding piece 42 is an acute angle. The end point of the acute angle faces the wind and the angle bisector 43 of the included angle is roughly parallel to the wind direction of the wind blown by the fan 3 to thereby reduce the resistance of the shielding cover 4 to the wind blown by the fan 3.

The included angle between the angle bisector 43 of the included angle between the first shielding piece 41 and second shielding piece 42 and the wind direction of the wind blown by the fan 3 is greater than or equal to 0 degrees and less than or equal to 20 degrees to thereby reduce the resistance of the shielding cover 4 to the wind blown by the fan 3.

The fan 3 is a centrifugal fan, where the blades of the centrifugal fan are at an acute angle to the radial direction, so that the wind from the centrifugal fan and the radial direction of the centrifugal fan are at an acute angle. The included angle between the angle bisector 43 of the included angle between the first shielding piece 41 and second shielding piece 42 and the radial direction of the centrifugal fan is greater than or equal to 10 degrees to less than or equal to 80 degrees, to thereby reduce the resistance of the shielding cover 4 to the wind blown by the fan 3.

The protective cover 6 of the air cooking device of the implementation of this application includes an air inlet 61, an air outlet 62, and a shielding portion 63 between the air inlet 61 and the air outlet 62. The shielding portion 63 is located under the heating device 1 to prevent the heating device 1 from directly heating the ingredients in the cooking cavity, and to prevent the surface of the ingredients from becoming burnt.

The above description is only the preferable implementation for this application, and does not impose any formal restriction on this application. Although this application has been disclosed as above with the preferable implementation, it is not used to limit this application. Any technical person who is familiar with this field can use the technical content disclosed above to make some changes or modifications and still fall within the scope of the technical solution of this application. Any simple modifications, equivalent changes and modifications made to the above implementation based on the technical essence of this application that do not deviate from the content of technical solution of this application are still within the scope of the technical solution of this application.

The invention claimed is:

1. An air cooking device comprising:
   a cooking cavity;
   a light radiation heating device located above the cooking cavity;
   a fan configured to suck up air in the cooking cavity, blow the air toward the light radiation heating device to generate hot air, and blow the hot air toward the cooking cavity to cook ingredients in the cooking cavity; and
   a protective cover under the fan, the protective cover having an air inlet, an air outlet, and a shielding portion between the air inlet and the air outlet,
   wherein the light radiation heating device is arranged about a periphery of the fan and produces light radiation,
   wherein the shielding portion is located under the light radiation heating device,
   wherein the shielding portion is configured to guide a flow of the air such that the air flows from the air inlet towards the air outlet and is heated by the light radiation heating device as the air passes by the light radiation heating device, and
   wherein the shielding portion is configured to prevent the light radiation produced by the light radiation heating device from directly irradiating the ingredients in the cooking cavity.

2. The air cooking device of claim 1, wherein a lowest point of the fan is higher than a lowest point of the light radiation heating device and lower than a highest point of the light radiation heating device.

3. The air cooking device of claim 1, wherein a position of the air outlet is lower than a position of the air inlet.

4. The air cooking device of claim 1, wherein the shielding portion includes a separating portion that extends from a lower side of the light radiation heating device to an inner side of the light radiation heating device and is positioned upwardly close to a lower side of the fan, and wherein the separating portion prevents the air blown by the fan toward the light radiation heating device from directly returning to the air inlet without passing through the light radiation heating device.

5. The air cooking device of claim 4, wherein the shielding portion includes a guiding portion that extends from the lower side of the light radiation heating device to an outer side of the heating device and is positioned downwardly away from the fan, and wherein the guiding portion keeps the hot air passing through the light radiation heating device away from the air inlet.

6. The air cooking device of claim 1, further comprising:
   a temperature measuring device located above the cooking cavity, wherein the temperature measuring device is used to detect a temperature in the cooking cavity; and,
   a shielding cover between the light radiation heating device and the temperature measuring device, the shielding cover shielding the temperature measuring device from the light radiation heating device.

7. The air cooking device of claim 6, wherein:
   the shielding cover includes a first shielding piece and a second shielding piece connected together;
   the temperature measuring device is located in a space enclosed by the first shielding piece and second shielding piece;
   an included angle between the first shielding piece and the second shielding piece is an acute angle; and,
   an end point of the acute angle faces toward a wind direction of a wind blown by the fan, and an angle bisector of the included angle is roughly parallel to the wind direction to thereby reduce a resistance of the shielding cover to the wind blown by the fan.

8. The air cooking device of claim 7, wherein another included angle between the angle bisector of the included angle between the first shielding piece and the second shielding piece and the wind direction of the wind blown by the fan is greater than or equal to 0 degrees and less than or equal to 20 degrees.

9. The air cooking device of claim 1, wherein the shielding portion is a solid portion, wherein the air inlet is disposed in a center of the protective cover and under the fan, wherein the air outlet is disposed proximate to a periphery of the protective cover, and wherein the shielding portion extends radially inwardly towards the air inlet and extends radially outwardly towards the air outlet.

10. The air cooking device of claim 1, wherein the shielding portion extends from a first location under the light radiation heating device towards a second location under the fan.

11. An air frying device positionable above a cooking cavity, the air frying device comprising:
   a light-wave tube;
   a fan configured to suck up air in the cooking cavity and blow the air toward the light-wave tube to generate hot air, and blow the hot air toward the cooking cavity to cook ingredients in the cooking cavity; and,
   a protective cover under the fan, the protective cover having an air inlet, an air outlet, and a shielding portion between the air inlet and the air outlet,
   wherein the light-wave tube is arranged about a periphery of the fan and produces light radiation,
   wherein the shielding portion is located under the light-wave tube,
   wherein the shielding portion is configured to guide a flow of the air such that the air flows from the air inlet towards the air outlet and is heated by the light-wave tube as the air passes by the light-wave tube, and
   wherein the shielding portion is configured to prevent the light radiation produced by the light-wave tube from directly irradiating the ingredients in the cooking cavity.

12. The air frying device of claim 11, wherein a lowest point of the fan is higher than a lowest point of the light-wave tube and lower than a highest point of the light-wave tube.

13. The air frying device of claim 11, wherein a position of the air outlet is lower than a position of the air inlet.

14. The air frying device of claim 11, wherein the shielding portion includes a separating portion that extends from a lower side of the light-wave tube to an inner side of the light-wave tube and is positioned upwardly close to a lower side of the fan, and wherein the separating portion prevents the air blown by the fan toward the light-wave tube from directly returning to the air inlet without passing by the light-wave tube.

15. The air frying device of claim 14, wherein the shielding portion includes a guiding portion that extends from the lower side of the light-wave tube to an outer side of the light-wave tube and is positioned downwardly away from the fan, and wherein the guiding portion keeps the hot air passing by the light-wave tube away from the air inlet.

16. The air frying device of claim 11, further comprising:
   a temperature measuring device located above the cooking cavity, wherein the temperature measuring device is used to detect a temperature in the cooking cavity; and,
   a shielding cover between the light-wave tube and the temperature measuring device, the shielding cover shielding the temperature measuring device from the light-wave tube.

17. The air frying device of claim 16, wherein:
   the shielding cover includes a first shielding piece and a second shielding piece connected together;
   the temperature measuring device is located in a space enclosed by the first shielding piece and second shielding piece;
   an included angle between the first shielding piece and the second shielding piece is an acute angle; and,
   an end point of the acute angle faces toward a wind direction of a wind blown by the fan, and an angle bisector of the included angle is roughly parallel to the wind direction to thereby reduce a resistance of the shielding cover to the wind blown by the fan.

18. The air frying device of claim 17, wherein another included angle between the angle bisector of the included angle between the first shielding piece and the second shielding piece and the wind direction of the wind blown by the fan is greater than or equal to 0 degrees and less than or equal to 20 degrees.

19. The air frying device of claim 11, wherein the shielding portion is a solid portion, wherein the air inlet is disposed in a center of the protective cover and under the fan, wherein the air outlet is disposed proximate to a periphery of the protective cover, and wherein the shielding portion extends radially inwardly towards the air inlet and extends radially outwardly towards the air outlet.

20. The air frying device of claim 11, wherein the shielding portion extends from a first location under the light-wave tube towards a second location under the fan.

* * * * *